United States Patent [19]

Kubozono

[11] Patent Number: 4,844,412
[45] Date of Patent: Jul. 4, 1989

[54] SPOOL DETENT DEVICE FOR MANUALLY OPERATED DIRECTIONAL CONTROL VALVE

[75] Inventor: Shigeru Kubozono, Saitama, Japan
[73] Assignee: Diesel Kiki Co., Ltd., Tokyo, Japan
[21] Appl. No.: 134,760
[22] Filed: Dec. 18, 1987
[30] Foreign Application Priority Data
Feb. 6, 1987 [JP] Japan .................. 62-24618
[51] Int. Cl.$^4$ .................................. F16K 35/04
[52] U.S. Cl. ..................... 251/297; 137/625.69
[58] Field of Search ............. 137/625.69; 251/297
[56] References Cited

U.S. PATENT DOCUMENTS

| | | | |
|---|---|---|---|
| 3,174,500 | 3/1965 | Johnson et al. | 251/297 X |
| 3,602,245 | 8/1971 | Meisel | 251/297 X |
| 3,790,129 | 2/1974 | Pauls | 251/297 |
| 3,891,182 | 6/1975 | Schwerin | 251/297 |
| 4,260,132 | 4/1981 | Habiger | 251/297 |
| 4,328,950 | 5/1982 | Aspinwall | 251/297 |

*Primary Examiner*—Gerald A. Michalsky
*Attorney, Agent, or Firm*—Henry C. Nields

[57] ABSTRACT

Provided is a device mounted on one end of valve body, remote from a manipulation lever attached to the other end of the spool, for retaining the spool at an offset position other than a position to which the spool is returned by the force of a return spring, wherein a shaft coaxial with the spool is formed directly therein with a linear guide section, a ring-like projection and a detent section, thereby the spool is retained not by pushing out balls in the direction radial from the axis of the spool, that is in the direction toward the inner wall of a casing, but by dropping the balls in the centripetal direction, that is, the direction toward the axis of the spool.

10 Claims, 5 Drawing Sheets

Fig.1
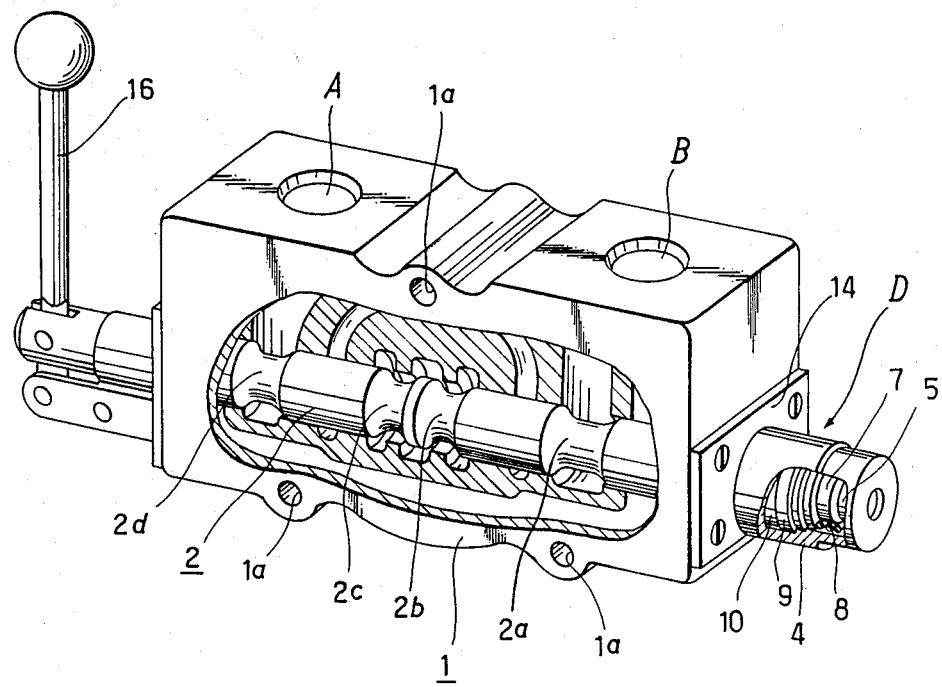
Fig.2-A  Fig.2-B
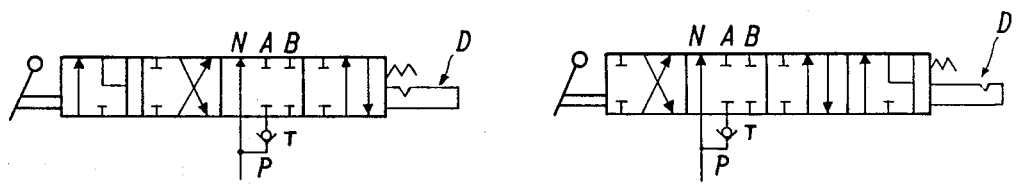

Fig. 3
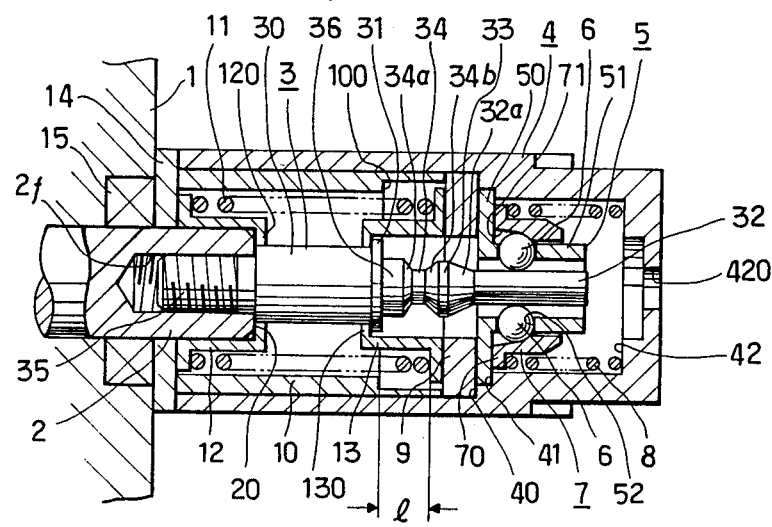
Fig. 4
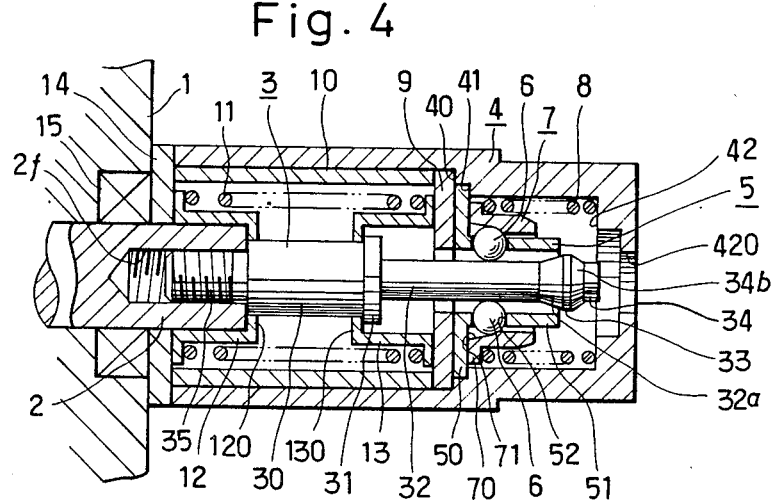
Fig. 4-A
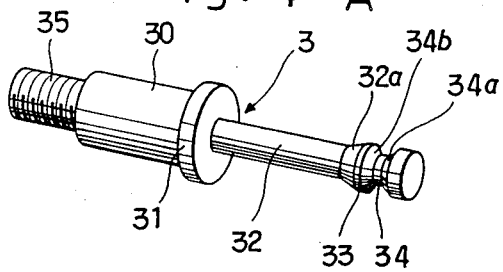

Fig. 5-A
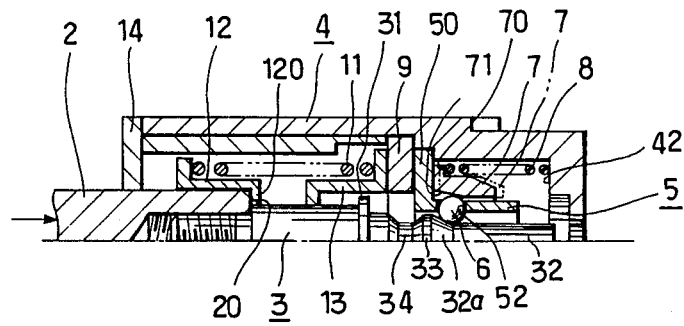
Fig. 5-B
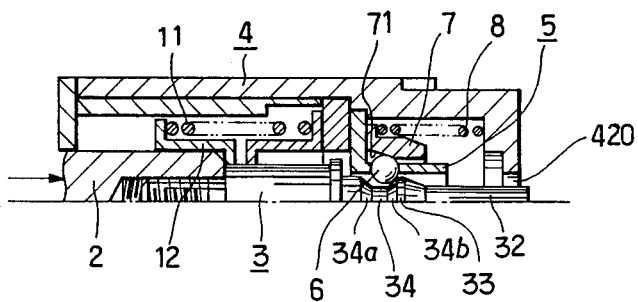
Fig. 5-C
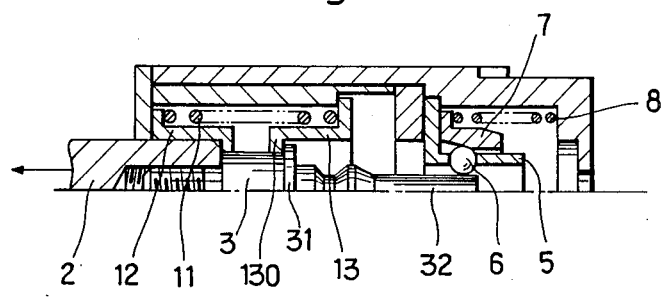

Fig. 6
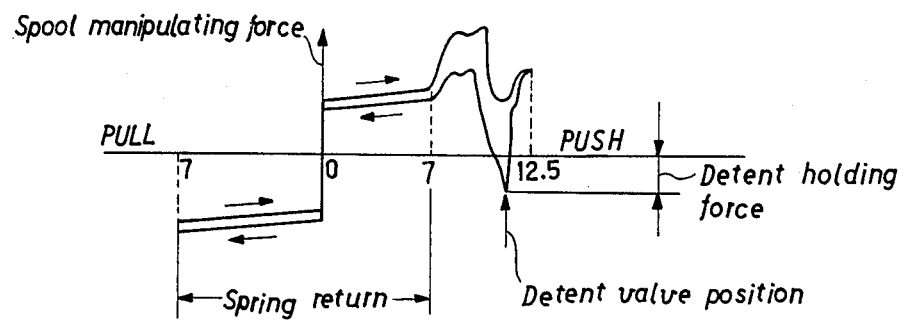
Fig. 7-A
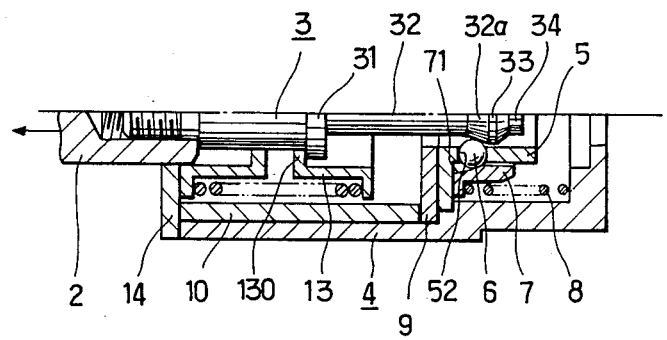
Fig. 7-B
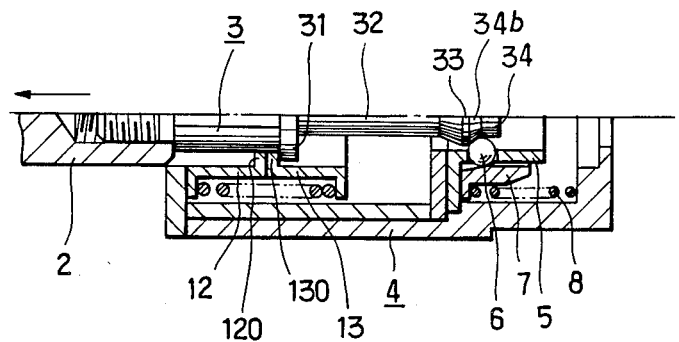

SPOOL DETENT DEVICE FOR MANUALLY OPERATED DIRECTIONAL CONTROL VALVE

FIELD OF THE INVENTION

The present invention relates to a spool detent device for a directional control valve used in a hydraulic circuit, and particularly to a spool detent device for a manually operated direction control valve

BACKGROUND OF THE INVENTION

Directional control valves for changing over the direction of hydraulic pressure from a hydraulic pump are incorporated in a hydraulic circuit, as means for controlling the operation of actuators, such as acceleration, deceleration and the like, in construction machines, agricultural machines and other various industrial machines.

Such directional control valves generally incorporate therein a spool which is manually controlled in its position by means of a hand lever, a pedal or the like in view of the necessity of manipulation under the operator's intention and economic reasons.

In a manually operated directional control valve of the type as mentioned above, a spool extends through a valve body, and is adapted to slide in a straight direction by means of a manipulating lever attached to one end of the spool, and a return spring is incorporated on the other end side of the spool, remote from the manipulating lever, for returning the spool to its neutral position (center valve position) when manipulation force is released from the lever. However, the directional control valve is sometimes required to be used in such a way that the spool valve is held, rather than the neutral valve position, at a predetermined offset valve position such as a spool position at which hydraulic oil is returned from an actuator into a tank while hydraulic oil discharged from a pump is subjected to neutral circulation. Accordingly, a detent device is used in the directional control valve for attaining this purpose.

The above-mentioned detent device incorporated in the directional control valve usually consists of an assembly including a return spring disposed in the outer wall of the valve body, as disclosed in Japanese Utility Model Laid-Open Publication No. 7977/1984 as a typical one. FIG. 8 illustrates a conventional detent device which comprises a front casing 4a receiving one end of a spool 2 and attached to a housing 1, and a rear casing 4b coupled in series to the front casing 4a through the intermediary of a partition ring. Further, in the front casing, there are disposed a return spring 11 for always urging the spool toward its neutral position, and a bolt 17 secured at one end to the spool 2 and extended from the front casing 4a into the rear casing 4b, the bolt 17 being formed therein with a deep stepped bore 170 extending axially from the rear end thereof, and being also formed in the outer peripheral wall of the rear end part thereof with a plurality of holes in which balls 6a are loosely fitted.

Further, a detent casing 18 formed on its inner surface with an annular projection 180 adapted to be engaged with the abovementioned balls is disposed in the rear casing 4b, and a small diameter bolt 22 is concentrically fitted in the bore 170, having a head 220 onto which a conical member 19 adapted to press the abovementioned ball 6a is fitted slidably in the axial direction while a spring 21 is disposed between the conical member 19 and the bottom of the bore to urge the conical member 19.

In the above-mentioned arrangement, since the annular projection 180 adapted to retain the spool 2 is formed on the inner cylindrical surface of the detent casing 18 and since the balls 6a and the detent spring 21 are disposed in the detent casing 18, the detent device should inevitably have a large diameter and a long length due to the positional relationship among the above-mentioned parts. In particular, the large diameter causes the detent device to project from the valve body in the widthwise direction of the latter (the direction orthogonal to the direction of insertion of the spool). As a result, if there are used a plurality of directional control valves (section) which are fastened together with the use of, for example, bolts to form a stack type multiple directional control valve, dimensional adjustment with the use of spacers and the like is required, resulting in the problems of complicated working and oil leakage from the joint of the stack.

Further, the small diameter bolt 22 serving as both stopper for the conical member 19 and spring guide is inevitably used in addition to the detent casing 18 and the bolt 17 in order to obtain a detent function. Accordingly, the number of required parts is large. Further, comparatively large labor and time have been conventionally required for machining and assembly for the detent device since the bolt 17 is machined to form the bore and a female thread part therein with a high degree of accuracy and is studded with the small diameter bolt 22 highly concentric with the bore, and since the small diameter detent spring is assembled around the small diameter bolt 22, and therefore, it has been difficult to aim at reducing the cost of the detent device.

SUMMARY OF THE INVENTION

The present invention is devised to eliminate the above-mentioned disadvantages, and therefore, the main object of the present invention is to provide a spool detent device for a manually operated directional control valve, in a small size although having a satisfactory detent function, which facilitates the stack working thereof and can prevent oil leakage inevitable with the use of spacers. Further, another object of the present invention is to provide a spool detent device for a manually operated directional control valve with a simple structure, which has a reduced number of required component parts and can reduce the cost of machining and assembly thereof. For accomplishing the above-mentioned objects, the arrangement according to the present invention excludes the conventional spool detent measure in which the balls are pushed out in the centrifugal direction about the axis of the spool to the present invention, or the direction toward the inner wall of the casing, but employs a unique arrangement that the balls are allowed to drop directly in the direction toward the center of the spool or the axis of the spool.

To this end, the present invention provides a device attached to a valve body on the side remote from a manipulating lever for a spool slidably fitted in the valve body, for retaining the spool at an offset position other than a return position to which the spool is normally returned by the force of a return spring, comprising a casing attached to the outside wall of the valve body so as to surrounding around the projecting end of the spool; concentrically therewith, a ring-like partition member secured to the casing so as to divide the inside of the casing into two portions; and a shaft coaxially secured in one end part of the spool within the casing. Said shaft has an overall length so as to pierce through the partition member and is adapted to be urged by a return spring disposed between the partition member and a plate toward the valve body. Said partition member is secured on the rear section thereof with a guide sleeve in which a plurality of balls are fitted movably in the direction orthogonal to the axis of the partition member while a ball retainer having a retainer surface adapted to make into contact with the balls is fitted onto the guide sleeve, movably in the axial direction. Said ball retainer is urged toward the partition member by a detent force exerting spring supported at one end to the end wall of the casing. Said shaft is formed with a linear guide section with which said balls make in rolling-contact, a ring-like projection which is connected with the linear guide section through the intermediary of a relatively gentle taper guide section, and a detent section adjacent to the ring-like projection and adapted to receive the balls.

The above-mentioned linear guide section, ring-like projection and detent section are arranged such that if the detent action is effected by push-in of the spool, the detent section, the ring-like projection and the linear guide section are arranged in the mentioned order in the direction from the base end to the free end of the shaft, and on the other hand, if the detect action is effected by pull-in of the spool, the linear guide section, the ring-like section and the detent section are arranged in the mentioned order in the direction from the base end to free end of the shaft.

The shaft is usually threaded into the spool so that they are secured with each other.

The ball retainer is integrally incorporated at its axial end part with a flange which bears one side of the detent force exerting spring. That is, the ball retainer also serves as a spring seat.

According to the present invention the detent force exerting spring is directly supported to the end wall of the casing in the vicinity of the inner peripheral surface of the same. And the ring-like projection and the detent section forming one part of the detent mechanism are directly formed in the shaft coaxial therewith. And the balls are arranged on the outer diameter side of the shaft so that the balls are pressed against the shaft by the ball retainer in order to act upon the ring-like projection and the detent section. Therefore, the space necessary for the detent operation may be made to be small, and it is possible to miniaturize the device. The diameter thereof can be reduced so that it is within the width of the valve body. Accordingly, in the case of stacking a plurality of directional control valves, they can be coupled in direct contact with each other without using spacers thereby to facilitate the stacking working procedure. Further, since no spacer can be used, the risk of oil leakage from the jointed surface parts of the control valves can be reduced.

Further, since the linear guide section, the ring-like projection and the detent section constituting the detent mechanism are formed directly in the shaft coaxial with the spool, a detent casing ad a small diameter bolt which have been indispensable in conventional detent mechanisms can be eliminated. Therefore, the number of necessary component parts can be reduced. Further, the machining of the inner surface of the shaft can be made by use of only a shaft ball retainer, the necessity of forming a stepped bore in the shaft, and the necessity of machining a detent casing formed on its inner surface with a ring-like projection can be eliminated. Furthermore the diameter of the detent force exerting spring can be reduced to a value substantially equal to that of the return spring, and therefore, the assembly thereof can be facilitated. Further, if two different kinds of arrangements of the guide section, the ring-like projection and the detent section are prepared, both push-in type detent device and pull-in type detent device can be optionally assembled in direct combination of the other component parts, thereby it is further possible to reduce the number of kinds of necessary component parts.

BRIEF DESCRIPTION OF THE DRAWINGS

The features and advantages of the present invention, in addition to the above-mentioned features and advantages, will be apparent from descriptions explained herein below in the form of various embodiment forms with reference to the drawings in which:

FIG. 1 is a partially cut-away view illustrating a manually operated directional control valve mounted with a detent device according to the present invention;

FIG. 2-A is a diagram view illustrating an example of push-in detent type directional control valve, mounted with a detent device according to the present invention;

FIG. 2-B is a diagram view illustrating an example of pull-in detent type directional control valves, mounted with a detent device according to the present invention;

FIG. 3 is a cross-sectional view illustrating one embodiment of the present invention incorporated in a push-in detent type directional control valve;

FIG. 4 is a cross-sectional view illustrating one embodiment of the present invention incorporated in a pull-in detent type directional control valve;

FIG. 4-A is a perspective view illustrating a shaft in one embodiment form which is different from that used in the arrangement shown in FIG. 4;

FIG. 5-A to FIG. 5-C are partially cross-sectional views illustrating the operation of the embodiment shown in FIG. 3;

FIG. 6 is a chart illustrating relationship among the detent locus, manipulating force and detent force of the embodiment shown in FIG. 3;

FIG. 7A and 7B are partially cross-sectional views illustrating the operation of the embodiment shown in FIG. 4.

DETAILED DESCRIPTION OF THE INVENTION

Figure 8:
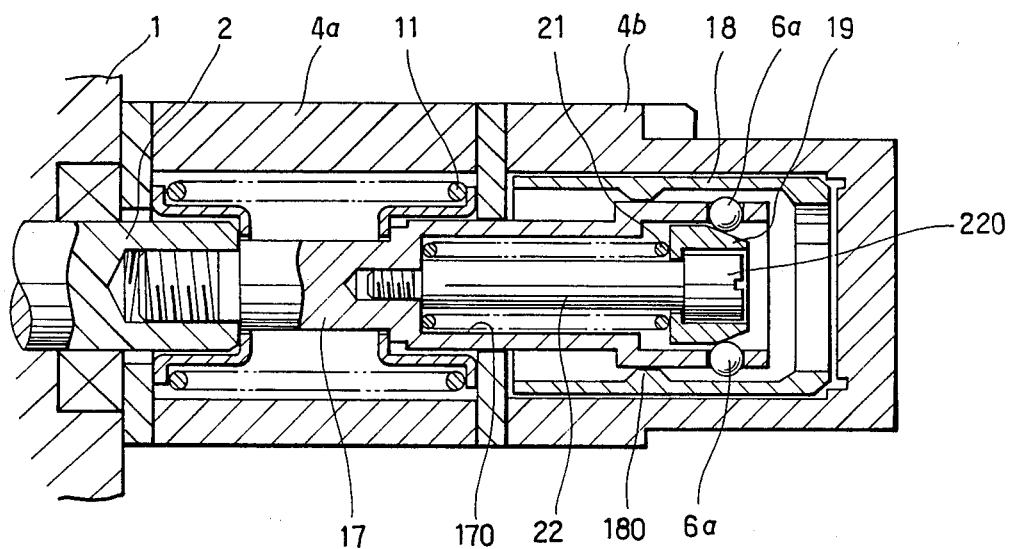
FIG. 8 is a cross-sectional view illustrating a spool detent device used in a conventional manually operated directional control valve.

The present invention will be explained hereinbelow with reference to the accompanied drawings.

FIG. 1 shows one example of a manually operated directional control valve in which a spool detent device according to the present invention is incorporated. Further, FIGS. 2-A and 2-B shows one example in which the device according to the present invention is incorporated in a four position directional selector valve, FIG. 2-A illustrating a push-in detent type while FIG. 2-B illustrating a pull-in detent type.

With reference to FIG. 1, reference numeral 1 denotes a valve body, and 2 denotes a spool which is fitted in a bore formed in the valve body 1, slidably along a straight line, which is formed therein a plurality of lands $2a, 2b, 2c, 2d$ associated with ports exemplified in FIGS. 2-A and 2-B, while the valve body 1 is formed therein with cylinder ports A, B opened to the top surface thereof, and further formed therein with a high pressure passage, a low pressure passage, a neutral passage and a plurality of through-holes 1a at several positions widthwise of the valve body 1, for receiving stacking stud bolts.

Said spool 2 has both end parts extending outward of the valve body 1 and a manipulation lever 16 is pivotally attached to one end part thereof, while the end parts extends into a spool detent device D.

FIGS. 3 and 4 show details of said spool detent device D, FIG. 3 illustrating a push-in detent type which is suitable for the selector valve shown in FIG. 2-A while FIG. 4 illustrating a pull-in detent type which is suitable for the selector valve shown in FIG. 2-B.

In either embodiment, a seal ring 15 is fitted in one end wall of the valve body 1, making into close contact with the outer peripheral surface of the spool 2, and is retained by a plate 14.

The spool detent device D has shaft 3 secured to the projecting end part of the spool 2, coaxially therewith, and casing 4 concentric with the shaft 3, having a length capable of surrounding the shaft 3, the inside of the casing 3 being partitioned into front and rear chambers by partition member 9 which allow free-movement of the shaft 3. A return spring 11 for urging the shaft 3 in the direction away from the valve body 1 is disposed in the chamber near to the valve body 1. And a guide sleeve 5, a ball retainer 7 and a detent force exerting spring 8 are arranged in the direction from the center to the outside within the chamber remote from the valve body 1.

In more detail, the shaft 3 has in its one end part a thread part 35 which is screwed into a female part formed in the spool 2, a shaft body 30 continuous with the thread part 35, having a diameter which is suitably smaller than that of the spool 2, and a flange part 31 extending from the terminal and part of the shaft body 30.

Further, in the area extending from the flange part 31 to the free end of the shaft 3, there are formed a linear guide section 32, a ring-like projection 33 connected with the linear guide section 32 through the intermediary of a gentle angle taper guide section 32a and a detent section 34 adjacent to the ring-like projection 33, the diameters of the linear guide section 32, the ring-like projection 33 and the detent section 34 being each less than that of the shaft body 30, and the diameters of the linear guide section 32 and the detent section 34 being substantially equal to each other.

In the embodiment shown in FIG. 3, the detent section 34, the ring-like projection 33 and the linear guide section 32 are arranged in the mentioned order in the direction from the flange part 31 to the free end of the shaft 3, the linear guide section 32 having a length such that it is extended further from the partition member 9 when the spool 2 takes its neutral valve position, and reaches the inside of the guide sleeve 5. In more detail, a short shaft section 36 is formed, continuous with the flange part 31, having a diameter equal to or less than that of the shaft body 30, and the detent section 34 is formed as a ring groove which is bounded by tapers 34a, 34b connecting the detent section 34 with the short shaft section 3 and the ring-like projection 33. Said taper guide section 32a has a angle which is more gentle than that of the tapers 34a, 34b.

Further, in the embodiment shown in FIG. 4, there are arranged the linear guide section 32, the ring-like projection 33 and the detent section 34 in the mentioned order in the direction from the flange part 31 to the free end. In more detail, the linear guide section 32 has a length such that it extends from the flange part 31 further from the partition member 9 and reaches the inside of the guide sleeve 5 when the spool 2 takes its neutral valve position The detent section 34 is formed in a short shaft -like shape extending from the root of the taper 34a descending from the ring-like projection 33 to the free end. Instead of the above-mentioned configuration, a ring groove bounded by the tapers 34a, 34b, similar to that shown in FIG. 4-A can be used The casing 4 is secured to the plate 14 by means of thread parts, bolts, welding, bonding or the like which are not shown. Inside of the casing 4, there are formed a first stepped part 40 and a second stepped part 41 which are projected orthogonal to the axis of the casing 4 at given depths from the opening end of the casing 4, and further, an end wall 42 is formed on the closed side thereof In order to shorten the length of the casing 4 and to make it applicable to both push-in detent type and pull-in detent type, a hole 420 which allows the guide section 32 to pierce there through, is formed in the end wall 42.

The guide sleeve 5 is integrally incorporated with a cylindrical section 51 having a diameter larger than that of the ring-like projection 33 of the shaft 3 and extending in parallel with the shaft 3, and a flange 50 projecting from the axial end part of the cylindrical section 51, and a plurality of holes 52. Holes 52 are formed in the circumferential surface of the cylindrical section, each hole 52 being fitted therein with a hard metallic or ceramic ball 6 movable or retractable in the direction orthogonal to the axis of the cylindrical section 51. That is, in the assembly condition of the balls 6 and the holes 52, the balls 6 are always made into contact with the linear guide section 32, and when they climb up the ring-like projection 33, they are pushed out radially of the cylindrical section 51.

The flange 50 is located so that it abuts against the second stepped part 41 of the casing 4, and the partition member 9 is made into close contact with the back of the second stepped part 41 through the intermediary of the first stepped part 40, and is pressed and secured by one end face of a ring spacer 10 fitted in the casing through the opening thereof.

The ball retainer has a bushing-like shape, and is disposed between the cylindrical section 51 of the guide sleeve 5 and the inner peripheral wall of the casing 4, slidably in the axial direction. This ball retainer 7 is integrally incorporated with a flange 70 opposing the flange 50 of the guide sleeve 5, at the axial end part of the ball retainer 7. The ball retainer 7 is formed on its inner diameter side with a conical pushing surface 71 the diameter of which is enlarged toward the flange. The detent force exerting spring 8 is a coil spring located near to the inner peripheral surface of the casing 4, one end of thereof being born by the flange 70 of the ball retainer 7 and the other end being born by the end wall 42 of the casing 4, thereby the spring urges the ball retainer 7 so as to make the flange 70 into contact with the flange 50 of the guide sleeve 5.

The return spring 11 is supported at both ends thereof by means of spring seats 12, 13 which are disposed in the ring spacer 10, one of the spring seats 12 having an inner flange 120 abutting against the end face 20 of the spool 2 and the other flange seat 13 having an inner flange 130 engaged with the flange part 31 of the shaft 3. This return spring mechanism is the same as used in the conventional arrangement.

It is noted here that, in the embodiment shown in FIG. 3, the ring space 10 is formed therein with a stopper part 100 at a position distant from the end of the ring spacer 10 by a length (1). This stopper part 100 is used, in the application of the spool 2 in the four-position selector valve, to stop the spring seat 13 at the extreme end of the spring return when the spool 2 is pulled to the position as, for example, shown in FIG. 2-A in which the spool is located at the rightmost position establishing B-T port connection and A-P port connection. Accordingly, in the case of the application to a three position selector valve, the stopper part is unnecessary.

Further, in some cases, the partition member 9 may be integrally incorporated with the guide sleeve 5 within the scope of the present invention

OPERATION

Next explanation will be made to the operation of the device according to the present invention.

The device according to the present invention is attached to each of the selector valves as shown in FIG. 2-A or 2-B, and the selector valves are stacked one upon another in order to establish a tandem or series circuit. In this explanation, the circuit allows hydraulic oil from all actuators to be returned at the detent position while hydraulic oil is circulated through a carry-over port N under the above-mentioned condition.

FIGS. 1 and 3 show such a condition that manipulating force is released, and the spool 2 is returned to its neutral valve position under the force of the return spring 11. At this time the balls 6 makes into contact with the outer periphery of the shaft at the middle of the linear guide section 32 in the lengthwise direction, while the ball retainer 7 is held such that the flange 70 is made into contact with the flange 50 of the guide sleeve 5 by the force of the detent force exerting spring 8.

In this condition, when the manipulation lever 16 is operated to push in the spool 2, the shaft 3 is moved in the axial direction integrally therewith, and since the spring seat 12 is pushed and moved by the end face 20 of the spool 2, the return spring 11 is compressed. Meanwhile, the balls 6 are inhibited from being released, by means of the ball retainer 7 while they roll on the linear guide section 32. Thereby, the spool 2 comes to a position where A-T port connection and P-B port connection are established as shown in FIG. 2-A.

When the spool 2 is pushed exceeding the return length of the return spring 11, as shown in FIG. 5-A, the taper guide section 32a of the shaft 3 make into contact with the balls 6, and thereby the spool actuating force is increased so that the detent starting position may be confirmed. Further, when the push-in operation of the spool 2 is further continued, the balls 6 climb up the taper guide section 32a due to the movement of the shaft 3, and are projected out radially of the guide sleeve 5 through holes 52. Since a pushing press surface 71 for receiving the pressing force by the balls 6 has a ring-like shape, a thrust force is effected through the ball retainer 7 which therefore moves in the axial direction overcoming the force of the detent force exerting spring 8 as indicated by the phantom line shown in FIG. 5-A.

Further, at the movement when the balls 6 go over the top of the ring-like projection 33, the balls 6 roll down on the taper 34b, and fit in the detent section 34 in the form of a ring groove. The diameter of this detent section 34 is as small as that of the linear guide section 32, and therefore, the pressing force against the pushing surface 71 is released, resulting in returning of the ball retainer 7 to its original position under the force of the detent force exerting spring 8. As a result, the balls 6 are subjected to a predetermined retaining force by the detent force exerting spring 8 so that the spool 2 is held at the leftmost detent position as shown in FIG. 2-A.

In order to release the detent, the manipulation is made reverse to the above-mentioned order to retract the spool 2. And in order to establish A-P port connection and B-P port connection the spool 2 is pulled until the spring seat 13 abuts against the stopper part 100. Due to the provision of the stopper part 100, the return length of the return spring becomes twice as large as the original length (1). For example, if the return length is 7 mm, the spool 2 may returns to its neutral valve position within a range ±7 mm. FIG. 6 shows the relationship between the movement of the balls 6 and the force thereof as in FIG. 5-A or 5-C, from which it is understood that a satisfactory spool detent effect can be obtained.

Further, FIGS. 7-A and 7-B show the detent starting condition and the detent condition, respectively, of the embodiment shown in FIG. 4. In this case a satisfactory detent condition can be obtained by the same operation as mentioned above, excepting that the manipulating force is a pulling force rather than a pushing force. However, in this arrangement, since the spring seats 12, 13 abut against each other in the detent condition, the spool 2 is inhibited from moving further.

What is claimed is:

1. A spool detent device for manually operated directional control valve, for holding a spool at an offset position other than a position to which said spool is returned by the force of return spring, comprising:
    i. a spool having a projecting part;
    ii. a valve body having an outer wall and a plate attached to the outer wall;
    iii. a casing 4 secured to said plate 14 attached to the outer wall of said valve body 1 so as to surround the projecting end part of said concentrically therewith, said casing having an end wall;
    iv. a partition member 9 secured to the casing so as to divide the inside of the casing into two portions;
    v. a shaft 3 secured to the end part of said spool within said casing coaxially therewith, the overall length of said shaft extending through the partition member, said shaft having a linear guide section, a ring-like projection connected to said linear guide section through a first intermediary taper guide section which increases in diameter towards said ring-like projection, and a detent section connected to said ring-like projection through a second taper section which decreases in diameter toward said detent section, the diameter of said first intermediary taper section increasing more gradually than the decrease in diameter of the second taper section;
    vi. a return spring disposed between said partition member and said plate so as to urge said shaft toward the valve body;
    vii. a guide sleeve 5 having a flange section and a cylindrical section, said flange section being secured to said partition member 9 coaxially with said shaft 3, and said cylindrical section having a plurality of holes adapted to receive a plurality of balls 6 which are moveable in the direction orthogonal to the axis of the guide sleeve 5;

viii. a ball retainer 7 slidably disposed between said guide sleeve flange section and the end wall of said casing, said ball retainer having a conical pushing surface adapted to contact with said balls and a flange 70 contacting the flange section 50 of the guide sleeve 5; and ix. a detent force exerting spring 8 supported between the end wall 42 of said casing 4 and the flange 70 of the ball retainer 7 so as to urge said ball retainer toward said partition member, said spring 8 and said ball retainer 7 being neutralized to urge the ball retainer 7 so that the balls 6 contact the linear guide section 32, and said ball retainer 7 being moved in the axial direction when the balls 6 are pushed radially by the first moderate taper guide section 32a upon moving of the spool 2, whereby the spring 8 is compressed, and the pressure being released from the balls when the balls 6 contact the detent section 34 from the second steep taper guide section 34b, and the pressure of the spring 8 being released at the same time when the ball retainer 7 returns, so that a required retainer is generated.

2. A spool detent device for a directional control valve as set forth in claim 1, wherein said detent section 34, said ring-like projection 33 and said linear guide section 32 are formed in the mentioned order in the direction from the base end to free end of said shaft 3, a spool detent effect being obtained by push-in of said spool 2.

3. A spool detent device for a directional control valve as set forth in claim 2, wherein said shaft 3 formed therein with a large diameter shaft body 30 having a thread part 35 screwed into said spool 2; a flange 31 continues to said shaft body 30 for contacting a spring seat 13 for said return spring 11; a short shaft section 36 having a diameter equal to or less than that of said valve shaft body 30; a ring groove-like detent section 34 bounded on both sides thereof by tapers 34a, 34b; a ring-like projection 33 connected to the top of one 34b of said taper a taper guide section 32a which descends from said ring-like projection 33 at an angle more gentle than that of said taper 34b; and a linear guide section 32 continues to the lower end of said taper guide section 32a, successively in the mentioned order, said line guide section 32 having an outer diameter substantially equal to that of said detent section 34, and having a length which extends into said guide sleeve 5 when said spool 2 takes its neutral valve position, and made into contact with said balls 6.

4. A spool detent device for manually operated directional control valve as set forth in claim 1, wherein a linear guide section 32, a ring-like projection 33 and a detent section 34 are formed successively in the mentioned order in the direction from the base end to free end of said shaft 3, a detent effect being obtained in association with the retraction of said spool 2.

5. A spool detent device for a directional control valve as set forth in claim 4, wherein said shaft 3 is formed therein with a large diameter shaft body 30 having a thread part screwed into said spool 2; a flange 31 continues to said shaft body 30 for contacting a spring seat 13 for said return spring 11; a straight linear guide section 32; a taper guide section 32a rising gently from said linear guide section 32; a ring-like projection 33 continues to the top of said taper guide section 32a; a descending taper 34b and a short shaft-like detent section 34 continues to the lower end of said taper 32a, successively in the mentioned order, said linear guide section 32 having a diameter substantially equal to that of said detent section 34, and having a length such that it extends into said guide sleeve 5 when said spool takes its neutral position, and therefore, it is made into contact with said balls 6.

6. A spool detent device for a directional control valve as set forth in claim 4, wherein said shaft 3 is formed therein with a large diameter shaft body 30 having a thread part 35 screwed into said spool 2; a flange section 31 continues to said body 30 for contacting a spring seat 13 for said shaft return spring 11; a linear guide section 32; a taper guide section 32a gently rising said linear guide section 32; a ring-like projection 33 continues to the top of said taper guide section 32a; a descending taper 34b and a ring groove-like detent section 34 continuous to the lower end of said taper 34b, successively in the mentioned order, said linear guide section 32 having a diameter substantially equal to that of said detent section 34, and having a length such that it extends into said guide sleeve 5 when said spool 2 takes its neutral position, and therefore, said guide section 32 is made into contact with said balls 6.

7. A spool detent device for a directional control valve as set forth in claim 1, wherein said casing 4 is formed with a first stepped part 40 and a second stepped part 41 which are orthogonal to the axis of said casing 4, said partition member 9 abuts against said first stepped part 40 while said guide sleeve 5 abuts against said second stepped part 41 through the intermediary of a flange 50 at the axial end of said sleeve 5, and said partition member 9 and said guide sleeve 5 are secured by a ring spacer 10.

8. A spool detent device for a directional control valve as set forth in claim 7, wherein said ring spacer 10 has a stopper section 100, and said return spring is supported at one end by a return spring seat 13; said stopper locking the return spring seat 13 during retraction of said spool.

9. A spool detent device for a directional control valve as set forth in claim 1, wherein said ball retainer 7 has an axial end part that is integrally incorporated with a flange 70 which bears said detent force exerting spring 8.

10. A spool detent device for a directional control valve as set forth in claim 1, wherein there are provided more than three spool positions.

* * * * *